US006465382B1

(12) United States Patent
Strebelle et al.

(10) Patent No.: US 6,465,382 B1
(45) Date of Patent: Oct. 15, 2002

(54) PROCESS FOR PRODUCING SPHERICAL CATALYST PARTICLES, CATALYST PARTICLES AND THEIR USE IN A CHEMICAL SYNTHESIS

(75) Inventors: Michel Strebelle, Brussels (BE); Helmut Derleth; Karl-Heinz Bretz, both of Nienberg (DE)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/554,113

(22) PCT Filed: Oct. 31, 1998

(86) PCT No.: PCT/EP98/07003

§ 371 (c)(1),
(2), (4) Date: Jul. 12, 2000

(87) PCT Pub. No.: WO99/24164

PCT Pub. Date: May 20, 1999

(30) Foreign Application Priority Data

Nov. 11, 1997 (GB) ................................................ 9723786

(51) Int. Cl.⁷ ................................................ B01J 29/89
(52) U.S. Cl. ................................ 502/9; 502/64; 502/71; 502/77; 502/242; 502/70
(58) Field of Search .............................. 502/64, 70, 71, 502/77, 60, 242, 9; 423/326

(56) References Cited

U.S. PATENT DOCUMENTS

| | | | |
|---|---|---|---|
| 4,755,283 A | | 7/1988 | Hashimoto et al. |
| 4,794,198 A | * | 12/1988 | Roffia et al. ............... 564/253 |
| 4,824,976 A | * | 4/1989 | Clerici et al. |
| 5,401,486 A | * | 3/1995 | Mueller et al. ............. 423/705 |
| 5,736,118 A | * | 4/1998 | Derleth et al. ............ 23/313 R |
| 5,736,479 A | * | 4/1998 | Schodel et al. |
| 5,965,476 A | * | 10/1999 | Balducci et al. |
| 6,106,803 A | * | 8/2000 | Hasenzahl et al. |

FOREIGN PATENT DOCUMENTS

| | | | |
|---|---|---|---|
| EP | 0 200 260 | | 11/1986 |
| GB | 2 000 986 | | 1/1979 |
| GB | 1 584 900 | | 2/1981 |
| WO | WO 94/20203 | * | 9/1994 |

OTHER PUBLICATIONS

Venuto P.B., Habib T.E., "Fluid catalytic cracking with zeolite catalysts" 1979, p. 48, table 8.
B. Notari "Structure–activity and selectivity relationship in heterogeneous catalysis", R.K. Grasselli and A.W. Sleight Editors, Elsevier, 1991, pp. 243–256.
A. Van der Pol and J. Van Hooff, Applied Catalysis A, 1992, vol. 92, pp. 93–111.
B. Notari, "Structure–activity and selectivity relationship in heterogeneous catalysis", R.K. grasselli & A.W. Sleight Editors, Elsevier, 1991, pp. 243–256.
A. Van der Pol & J. Van Hooff, Applied Catalysis A, 1992, vol. 92, pp. 93–111.

* cited by examiner

Primary Examiner—Stuart L. Hendrickson
Assistant Examiner—Christina Ildebrando
(74) Attorney, Agent, or Firm—Larson & Taylor PLC

(57) ABSTRACT

Process for producing spherical catalyst particles containing a zeolite as active element, according to which a sol containing zeolite crystals and at least one gel-forming compound is sprayed from below directly into a reaction zone containing a reaction gas such that the sol breaks up into individual sol beads immediately before or upon entry into the reaction zone, the sol beads flow through the reaction zone on a curved trajectory, in so doing are pre-consolidated and the sol beads are collected on a collecting means.

12 Claims, No Drawings

PROCESS FOR PRODUCING SPHERICAL CATALYST PARTICLES, CATALYST PARTICLES AND THEIR USE IN A CHEMICAL SYNTHESIS

FIELD OF THE INVENTION

The present invention relates to a method for producing spherical catalyst particles containing a zeolite as active element, to catalyst particles containing a zeolite as active element and to the use of these particles in epoxidation reactions.

BACKGROUND OF THE INVENTION

It is known, for instance from the European patent application EP-A2-0 200 260, to use microspheres having an average diameter close to 20 $\mu$m and constituted by oligomeric silica and by titanium-silicalite crystals as catalyst particles for the epoxidation of olefins. It is further known that such catalysts tend to desactivate and that they consequently need to be regenerated regularly. When these catalyst particles of relative small average diameter are used as such in epoxidation reactors, they are difficult to isolate from the reaction medium in order to be transferred to the regeneration treatment. In order to avoid this problem, larger catalyst particles can be used. However, these particles present a lower activity and inferior mechanical properties. Moreover, the known relatively small particles are not suitable for use in a fluid bed reactor because at a normal velocity of the fluid, they tend to be carried over.

SUMMARY OF THE INVENTION

It is an object of the invention to provide a method for the production of spherical catalyst particles which permits the shaping of particles which are suitable to be isolated easily from the reaction medium and which present a high catalytic activity and good mechanical properties.

Consequently, the invention concerns a process for producing spherical catalyst particles containing a zeolite as active element, according to which a sol containing zeolite crystals and at least one gel-forming compound is sprayed from below directly into a reaction zone containing a reaction gas such that the sol breaks up into individual sol beads immediately before or upon entry into the reaction zone, the sol beads flow through the reaction zone on a curved trajectory, in so doing are pre-consolidated and the sol beads are collected on a collecting means.

One of the essential characteristics of the invention is that the particle size range of the sol beads can be modulated and controlled by the kind of spraying device used and this particle size range can be maintained without deformation during the process due to the special process conditions. Consequently, the size range of the catalyst particles can easily be controlled. This allows the production of catalyst particles of the desired granulometry, which makes it possible to easily isolate them from the (epoxidation) reaction medium, to have a high catalytic activity and good mechanical properties.

Another advantage of the invention is that the place and time of the formation of the sol beads is advantageously matched to the beginning of gelling (pre-consolidation) of the sol beads. This means that at the time at which the sol beads are produced, they are still liquid sol drops having a virtually ideal spherical shape and largely identical sphere diameters. The sol beads are then fixed, i.e. pre-consolidated, in their virtually ideal uniform spherical shape as they pass through the reaction zone, so that they are largely protected from deformative effects. Finally the sol beads pre-consolidated in their spherical shape are stably fixed by additional known measures of the generally known sol-gel process. To this end, the spraying-in device is arranged at a certain distance (as described below) below the entry opening into the reaction zone. This distance corresponds approximately to the distance, starting from the spraying device, in which the sol breaks up into sol beads. In addition, the sol is sprayed out of the spraying device from below, i.e. counter to the force of gravity. This means that the sol is sprayed at a given angle $\alpha$ which is formed by a horizontal axis at right-angles to the force of gravity and the tangent of the sprayed sol at the exit point from the spraying system.

DETAILED DESCRIPTION OF THE INVENTION

The process according to the invention is suitable for the production of catalyst particles containing zeolite as active element by gelling gellable sols containing zeolite crystals and one or more gel-forming compounds.

"Zeolite" is to be understood to mean synthetic crystalline materials presenting a zeolite crystalline structure. The zeolite crystals can have a crystalline structure of the ZSM-5 type. The zeolite crystals can also have a structure of the ZSM-11 or MCM-41 type. They advantageously contain oxides of silicon and titanium. Usually the zeolite crystals contain at most 2% by weight of titanium. Zeolite crystals of the titanium silicalite type are preferably used. They are in particular represented by the formula $xTiO_2(1-x)SiO_2$ in which x is from 0.0001 to 0.5 and preferably from 0.001 to 0.05. The zeolite crystals present advantageously an infrared absorption band at approximately 950–960 $cm^{-1}$. The best results are obtained with zeolite crystals of the TS-1 type which presents a microporous crystalline zeolite structure of the ZSM-5 type wherein several silicon atoms are replaced by titanium atoms. The properties of these TS-1 crystals are known (B. Notari; Structure-Activity and Selectivity Relationship in Heterogeneous Catalysis; R. K. Grasselli and A. W. Sleight Editors; Elsevier; 1991; p. 243–256). Their synthesis is also known (A. Van der Poel and J. Van Hooff, Applied Catalysis A, 1992, volume 92, pages 93–111). The zeolite crystals used generally present an average diameter of at most 10 $\mu$m. The average diameter is generally of at least 0.1 $\mu$m but can even be smaller. Average diameters ranging from 1 to 5 $\mu$m are preferred. Such crystals present the advantage that the mechanical strength of the catalyst particles is improved.

The zeolite crystals and the gel-forming compound are generally used in a quantity such that the catalyst particles contain from 5 to 95 wt % of zeolite preferably from 20 to 50 wt %.

The gel-forming compounds can be based on inorganic oxides such as magnesium oxide, aluminium oxide, silicon dioxide, alumosilicate, zinc oxide, titanium dioxide, chromium oxide, manganese oxide, cerium oxide, tin oxide, iron oxide, nickel oxide, lead oxide, molybdenum oxide, vanadium oxide, thorium oxide, zirconium oxide and/or hafnium oxide. Preferred gel-forming compounds are based on silicon dioxide. The sols can in addition to the gel-forming compounds contain additional additives which can improve the use-related and/or catalytic properties of the catalyst particles.

According to the process of the invention a gellable sol containing zeolite crystals and at least one gel-forming compound is sprayed from bottom to top into the reaction zone at an angle which depends on the dimensions of the equipment used. The angle is preferably such that the flow of sol beads does not touch the walls of the equipment. In practice the angle is often chosen from 80 to 88°. Depending on the particle size range, syringes with cannulae of different diameters or known spray nozzles, centrifugal discs, spray wheels, ultrasonic nozzles or bells, spray guns, turbo bells, magnetic valves, mechanically operated nozzles or spraying systems, such as are used in electrostatic spraying or in jet printers (e.g. piezo-excited nozzles), may be used as spraying devices. The particle size range in this case is varied by means of the spraying device used. For a desired particle size in the range from 0.01 mm to 0.3 mm, therefore, expediently turbo bells, micromagnetic valves or spray nozzles, e.g. known spiral nozzles (e.g. spiral nozzles manufactured by SPRAYBEST) or preferably ultrasonic nozzles are used. For a desired particle size in the range from 0.3 to 5 mm, in particular 0.3 mm to 3.5 mm, expediently spray wheels or preferably cannulae of corresponding diameter are used. If there is a very short distance from the spraying device to the entry opening of the reaction zone containing the reaction gas, it may be expedient, e.g. when using spray nozzles or cannulae of small diameter, to blow on the spraying device with a purge gas (e.g. compressed air or water vapor, in order thus to avoid clogging of the spraying device by prematurely gelling sol.

According to a first variant, the sol is in the form of an instable sol obtained by combining two components, e.g. by mixing together an alkaline component with an acidic component. One of these two components can contain the zeolite crystals. For example, a sol containing zeolite crystals and silicon dioxide, which can be used in the process of the invention, can be obtained by mixing together as alkaline component an aqueous solution of an alkali metal silicate, e.g. a sodium silicate solution, with the aqueous solution of an inorganic acid, e.g. an aqueous sulphuric acid or hydrochloric acid solution, or an organic acid, e.g. an aqueous formic acid or acetic acid solution in known manner. The zeolite crystals are preferably incorporated in the acidic component. Both the alkaline and acidic component may in this case have added additional constituents, for example aluminium or magnesium compounds. An instable sol containing zeolite crystals and silicon dioxide can also be obtained by reacting silicic acid alkyl ester with an alkaline component, e.g. with NaOH, $NH_3$ or an acidic component, e.g. with hydrochloric acid, or silicon tetrachloride with an acid component, e.g. with aqueous formic acid. In this case, the zeolite crystals are preferably not incorporated in the alkaline component.

According to a second variant, the sol is in the form of a metastable sol which does not gel until it makes contact with the reaction gas. Metastable silica sols, e.g. BAYER S200®, can be used.

Sols which contain additional components in homogeneous or heterogeneous form can also be used. As heterogeneous components, they may for example contain fines of any known type, quantity and particle size. In order to improve the use-related properties, for example fillers may be added as fines. Mineral fillers are advantageously added to improve the mechanical strength and the water resistance of the catalyst particles. Organic fillers as well as inorganic fillers can modify the porosity of the catalyst particles. The mineral fillers can be chosen from silicic acids, alumosilicates, aluminium oxides, titanium dioxide, kaolin, montmorillonite, bentonite. The organic fillers can be chosen from starch, wood flour or activated carbon. These fillers may be added to the acidic and/or alkaline component in crystalline or amorphous form, or alternatively in highly-dispersed form. Fines which change the catalytic properties of the particles may also be used in conventional manner. Examples of homogeneous components which can be added are magnesium, zirconium, copper, lead or titanium acetyl acetonates.

The mixing of the alkaline component to the acidic component to form a gellable instable sol can be performed in known manner in any mixing device suitable for the purpose, e.g. a mixing nozzle. Then the sol thus obtained is pumped directly into a spraying device, with which it can be sprayed into the reaction gas from below.

The process of the invention can be carried out using the device described in the international patent application WO 94/20203, in particular the devices of FIGS. 1 or 2.

In the process of the invention, the sol beads, at the moment of their formation, are subjected to the gelling action of the reaction gas practically immediately. The breaking down of the sol into individual sol beads depends on the viscosity of the sol, the spraying device and the pressure with which the sol leaves the spraying device, in addition to the angle. It is advantageous that the point of breakup of the sol into individual sol beads is located immediately before or in the entry opening of the reaction zone.

After entering the reaction zone, the sol beads formed pass through the reaction gas located in the reaction zone on a curved trajectory (parabola-like form), and in so doing are fixed in their spherical shape, i.e. are pre-consolidated. The reaction gas can therefore contribute to the pre-consolidation of the sol beads for a particularly long time, so that this already minimises the risk of deformation of the sol beads when they hit the collecting device. By additionally heating the reaction zone, e.g. to approximately 200° C., the pre-consolidation can be optionally further supported. In order to reduce still further the risk of deformation, if desired a collection device which is adjustable in height can be brought in close to the point of reversal of the parabolic trajectory of the sol beads, at which the sol beads have their lowest kinetic energy.

A film stretched flat, such as a PVDF film or polyethylene or PVC film, or a smooth collecting plate or a collecting container filled with liquid can be used as the collecting device in the process of the invention. When using a smooth collecting plate, this can be cooled as such, or a plate covered uniformly with solid carbon dioxide can be used. Particularly preferred process variants use a collecting container filled with a liquid, e.g. with water or preferably with a reaction liquid, as collecting device. "Reaction liquids" are to be understood to mean all conventional acidic or alkaline liquids used for ageing particles. Customary reaction liquids for this purpose are aqueous ammonia solution, e.g. a 5 to 10% aqueous ammonia solution, or acidic reaction liquids such as hydrochloric acid, sulphuric acid or nitric acid in concentrations of 1 to 5% by weight. Acidic liquids are preferred. When using a reaction liquid, expediently reaction gases equivalent thereto should be used in the reaction zone. If e.g. an aqueous ammonia solution is provided as reaction liquid, ammonia gas or vapors of organic amines should be used as reaction gas. When using acidic reaction liquids such as hydrochloric acid, sulphuric acid or nitric acid, the acidic reaction gases equivalent thereto, i.e. hydrogen chloride, sulphur dioxide or nitrogen oxides should be used.

When using self-gelling sols, inert gases such as air or oxygen can also be used as reaction gases. In this case, the pre-consolidation of the sol particles can be supported by heating the reaction zone. Temperatures below room temperature can also be used in the reaction zone.

From the collecting device, the pre-consolidated sol particles can be washed, dried and optionally calcined. Drying is usually carried out at temperatures in the range from 100 to 200° C. for a period of 1 to 24 hours. In one variant, the pre-consolidated sol particles, when using a film stretched flat or a smooth collecting plate as collecting device, can also be converted directly into a drying unit, e.g. into a known spray dryer.

The spherical particles obtained according to the process of the invention, may also be subjected to a treatment with a lower alkyl alcohol, in particular a $C_1$ to $C_4$ alcohol or to treatment with acetone, before they are sent for drying once they have been collected in the collecting device. Due to this treatment firstly advantageously agglutination of the resulting particles (especially those having an average diameter of less than 1 mm) can be avoided during drying, and secondly the pore volume of the resulting particles can be expanded.

One of the advantages of the process according to the invention is that it permits the shaping of particles which are as uniformly spherically shaped as possible, with a narrow grain spectrum and narrow pore diameter distribution. So, the occurence of relatively large quantities of undersize or oversize can be largely avoided. Furthermore, the particles produced demonstrate high abrasion resistance.

By means of the process of the invention, it is possible to obtain spherical catalyst particles containing zeolite as active element, which have (a) a diameter in the range of 0.01 to 5 mm, preferably 0.02 to 3.5 mm. Diameters in the range of 100 to 200 μm are particularly suitable for catalyst particles used in slurry processes. Diameters in the range of 500 μm to 1 mm are convenient for catalyst particles used in fluid bed reactors. Diameters in the range of 750 μm to 1 mm are convenient in fixed bed reactors.

(b) a specific surface area in the range of 1 to 900 $m^2/g$, preferably 100 to 800 $m^2/g$ (measured according to recording and evaluation of nitrogen sorption curves), (c) a bulk density in the range of 0.1 to 1.0 g/ml, (d) a pore volume in the range of 0.25 to 2.5 ml/g (measured according to mercury porosimetry or recording and evaluation of nitrogen sorption curves), (e) a distribution of the pore diameters having a maximum (monomodal pore distribution) in the range of 15 to 2000 Å, preferably 15 to 400 Å (measured according to mercury porosimetry or recording and evaluation of nitrogen sorption curves).

Furthermore, the invention covers the use of the spherical particles described above as catalysts for chemical synthesis. The catalyst particles can in particular be used in epoxidation reactions of olefinic compounds using a peroxide. Good results are obtained in the epoxidation of allyl chloride with the aid of hydrogen peroxide into 1,2-epoxy-3-choloropropane. They can also be used in the epoxidation of propylene with hydrogen peroxide into 1,2-epoxypropane.

The invention also concerns a process for the epoxidation of olefinic compounds with the aid of a peroxide in the presence of the above described catalyst particles containing a zeolite as the active element. The olefinic compound is preferably allyl chloride or propylene. The peroxide is preferably hydrogen peroxide.

The following example is intended to explain the invention but without restricting it.

EXAMPLE 1

An aqueous suspension of TS-1 crystals of an average diameter of 2.5 μm containing 19.2 wt % of the crystals has been prepared. 2440 g of this suspension has been mixed with 2108 g of a 19.4 wt % sulphuric acid solution. This mixture (1) has been injected in a device similar to that shown in FIG. 1 of the international patent application WO 94/20203 together with an alkaline waterglass solution (2) containing 5.0 wt % $Na_2O$ and 16.8 wt % $SiO_2$. The co-injection was carried out in such a manner that a sol was formed of (1) and (2) which presented a pH of 6.9. The device contained air as reaction gas. The collecting device was filled with water. The collected particles have been washed with water and calcined at 550° C. during 6 hours. The particles thus obtained contained 36 wt % of TS-1 (the rest being silica) and presented a specific surface area of 431 $m^2/g$, a bulk density of 0.52 g/ml, a pore volume of 0.75 $cm^3/g$ (BET $N_2$). 97.5 wt % of the particles had a diameter of 1 to 1.4 mm, less than 0.2 wt % of the particles had a diameter greater than 1.4 mm, less than 2.5 wt % of the particles had a diameter smaller than 1 mm and less than 0.4 wt % of the particles had a diameter smaller than 0.85 mm. The particles presented a pore diameter comprised within the range from 15 to 160 Å and an average pore diameter of 55 Å.

What is claimed is:

1. A process for producing spherical catalyst particles containing a zeolite as active element, the zeolite containing framework oxides of silicon and titanium, said process comprising:
   spraying a sol containing zeolite crystals and at least one gel-forming compound directly into a reaction zone containing a reaction gas from below, such that the sol breaks up into individual sol beads immediately before or upon entry into the reaction zone, the sol beads flowing through the reaction zone on a curved trajectory, thereby pre-consolidating the sol beads; and
   collecting the sol beads via a collecting device to form the spherical catalyst particles.

2. The process according to claim 1, wherein the zeolite crystals have a crystalline structure of the ZSM-5, ZSM-11 or MCM-41 type.

3. The process according to claim 1, wherein the zeolite crystals present an infrared absorption band at approximately 950–960 $cm^{-1}$.

4. The process according to claim 1, wherein the zeolite crystals are represented by the formula $xTiO_2(1-x)SiO_2$ in which x is from 0.0001 to 0.5.

5. The process according to claim 1, wherein the zeolite crystals are represented by the formula $xTiO_2(1-x)SiO_2$ in which x is from 0.001 to 0.05.

6. The process according to claim 1, wherein the sol contains fines.

7. The process according to claim 1, further comprising using a container filled with a reaction solution as the collecting device and the reaction gas.

8. The process according to claim 7 wherein the reaction solution comprises an aqueous ammonia solution and the reaction gas comprises ammonia.

9. The process according to claim 7, wherein the reaction solution comprises an aqueous acid selected from the group consisting of hydrochloric acid, sulfuric acid and nitric acid, in combination with the reactive gas being selected from the group consisting of hydrogen chloride, sulfur dioxide and nitrogen oxide, respectively.

10. The process of claim 1, wherein said spraying a sol comprises spraying a sol having a pH of about 6.9 into the reaction zone.

11. The process of claim 1, further comprising calcinating the spherical catalyst particles.

12. The process of claim 11, wherein said calcinating the spherical catalyst particles comprises calcinating at about 550° for about six hours.

* * * * *